US007277881B2

(12) United States Patent
Imaichi et al.

(10) Patent No.: US 7,277,881 B2
(45) Date of Patent: Oct. 2, 2007

(54) DOCUMENT RETRIEVAL SYSTEM AND SEARCH SERVER

(75) Inventors: Osamu Imaichi, Wako (JP); Toru Hisamitsu, Oi (JP); Makoto Iwayama, Tokorozawa (JP); Shingo Nishioka, Higashimatsuyama (JP); Yoshiki Niwa, Hatoyama (JP)

(73) Assignee: Hitachi, Ltd., Tokyo (JP)

( * ) Notice: Subject to any disclaimer, the term of this patent is extended or adjusted under 35 U.S.C. 154(b) by 474 days.

(21) Appl. No.: 09/942,905

(22) Filed: Aug. 31, 2001

(65) Prior Publication Data

US 2002/0184186 A1    Dec. 5, 2002

(30) Foreign Application Priority Data

May 31, 2001   (JP)   ............................. 2001-165075

(51) Int. Cl.
*G06F 7/00*     (2006.01)
*G06F 17/30*    (2006.01)

(52) U.S. Cl. .................. 707/3; 707/4; 707/5; 707/6

(58) Field of Classification Search ................ 707/10, 707/100, 1–6, 7; 715/500, 513
See application file for complete search history.

(56) References Cited

U.S. PATENT DOCUMENTS

| | | | | |
|---|---|---|---|---|
| 5,146,600 A | * | 9/1992 | Sugiura | 707/104.1 |
| 5,452,451 A | * | 9/1995 | Akizawa et al. | 707/6 |
| 5,454,105 A | * | 9/1995 | Hatakeyama et al. | 707/2 |
| 5,659,732 A | * | 8/1997 | Kirsch | 707/5 |
| 5,802,518 A | * | 9/1998 | Karaev et al. | 707/9 |
| 5,826,261 A | * | 10/1998 | Spencer | 707/3 |
| 5,899,995 A | * | 5/1999 | Millier et al. | 707/102 |
| 5,926,811 A | * | 7/1999 | Miller et al. | 707/5 |
| 5,987,460 A | * | 11/1999 | Niwa et al. | 707/6 |
| 6,006,217 A | * | 12/1999 | Lumsden | 707/2 |
| 6,018,733 A | * | 1/2000 | Kirsch et al. | 707/3 |
| 6,041,326 A | * | 3/2000 | Amro et al. | 707/10 |
| 6,070,157 A | * | 5/2000 | Jacobson et al. | 707/1 |
| 6,078,917 A | * | 6/2000 | Paulsen et al. | 707/6 |
| 6,128,613 A | * | 10/2000 | Wong et al. | 707/7 |
| 6,269,368 B1 | * | 7/2001 | Diamond | 707/6 |
| 6,415,285 B1 | * | 7/2002 | Kitajima et al. | 707/5 |
| 6,457,004 B1 | * | 9/2002 | Nishioka et al. | 707/5 |
| 6,484,162 B1 | * | 11/2002 | Edlund et al. | 707/3 |
| 6,513,032 B1 | * | 1/2003 | Sutter | 707/3 |

(Continued)

FOREIGN PATENT DOCUMENTS

EP          0 851 368 A2 *  1/1998

(Continued)

*Primary Examiner*—John Breene
*Assistant Examiner*—Anh Ly
(74) *Attorney, Agent, or Firm*—Mattingly, Stanger, Malur & Brundidge, P.C.

(57) ABSTRACT

Ordering is properly performed for document databases registered in an associative search server. In an associative search server capable of performing an associative search by correlating a plurality of document databases, the history of the associative search is stored as an associative search recording table by associative search recording table storing means. By using this associative search recording table, a showing order of document databases presented by document database selecting means is properly set by showing order changing means. Alternatively, by registration fee calculating means, calculation is properly carried out as to registration fees of the document database registered in the associative search server.

17 Claims, 14 Drawing Sheets

| To \ From | $DB_1$ | $DB_2$ | $DB_3$ | Total |
|---|---|---|---|---|
| $DB_1$ | $x_{11}$ | $x_{12}$ | $x_{13}$ | $X_1$ |
| $DB_2$ | $x_{21}$ | $x_{22}$ | $x_{23}$ | $X_2$ |
| $DB_3$ | $x_{31}$ | $x_{32}$ | $x_{33}$ | $X_3$ |
| Keyword | $x_{41}$ | $x_{42}$ | $x_{43}$ | $X_4$ |
| Total | $Y_1$ | $Y_2$ | $Y_3$ | |

$$X_i = \sum_{j=1}^{3} x_{ij}$$

$$Y_j = \sum_{i=1}^{4} x_{ij}$$

U.S. PATENT DOCUMENTS

| | | | |
|---|---|---|---|
| 6,532,459 B1* | 3/2003 | Berson | 707/3 |
| 6,539,386 B1* | 3/2003 | Athavale et al. | 707/10 |
| 6,584,460 B1* | 6/2003 | Iwayama et al. | 707/3 |
| 6,602,300 B2* | 8/2003 | Ushioda et al. | 715/536 |
| 6,615,200 B1* | 9/2003 | Kayahara | 707/2 |
| 6,638,314 B1* | 10/2003 | Meyerzon et al. | 707/10 |
| 2001/0047351 A1* | 11/2001 | Abe | 707/3 |
| 2002/0078030 A1* | 6/2002 | Iwayama et al. | 707/1 |
| 2002/0099685 A1* | 7/2002 | Takano et al. | 707/1 |
| 2002/0143758 A1* | 10/2002 | Aref | 707/4 |
| 2002/0169771 A1* | 11/2002 | Melmon et al. | 707/5 |
| 2002/0184186 A1* | 12/2002 | Imaichi et al. | 707/1 |
| 2003/0088554 A1* | 5/2003 | Ryan et al. | 707/3 |
| 2003/0195876 A1* | 10/2003 | Hughes et al. | 707/3 |
| 2003/0220916 A1* | 11/2003 | Imaichi et al. | 707/3 |
| 2004/0122656 A1* | 6/2004 | Abir | 704/4 |
| 2005/0108223 A1* | 5/2005 | Silverbrook et al. | 707/3 |
| 2006/0149719 A1* | 7/2006 | Harris | 707/3 |

FOREIGN PATENT DOCUMENTS

JP      2000-155758      6/2000

* cited by examiner

Fig.3

| To<br>From | DB$_1$ | DB$_2$ | DB$_3$ | Total |
|---|---|---|---|---|
| DB$_1$ | $x_{11}$ | $x_{12}$ | $x_{13}$ | $X_1$ |
| DB$_2$ | $x_{21}$ | $x_{22}$ | $x_{23}$ | $X_2$ |
| DB$_3$ | $x_{31}$ | $x_{32}$ | $x_{33}$ | $X_3$ |
| Keyword | $x_{41}$ | $x_{42}$ | $x_{43}$ | $X_4$ |
| Total | $Y_1$ | $Y_2$ | $Y_3$ | |

$$X_i = \sum_{j=1}^{3} x_{ij}$$

$$Y_j = \sum_{i=1}^{4} x_{ij}$$

Fig.5

| To<br>From | DB$_1$ | DB$_2$ | DB$_3$ | Total |
|---|---|---|---|---|
| DB$_1$ | *10* | *20* | *30* | *60* |
| DB$_2$ | ... | ... | ... | ... |
| DB$_3$ | ... | ... | ... | ... |
| Keyword | *60* | *40* | *20* | *120* |
| Total | ... | ... | ... | |

Fig.14

| user ID | user name | password | table ID | registration date |
|---|---|---|---|---|
| 11 | AAAA | **** | 1 | YYYYMMDD |
| 22 | BBBB | **** | 2 | YYYYMMDD |
| 33 | CCCC | **** | 3 | YYYYMMDD |

DOCUMENT RETRIEVAL SYSTEM AND SEARCH SERVER

BACKGROUND OF THE INVENTION

1. Field of the Invention

The present invention relates to a document search system capable of performing an associative search by correlating a plurality of document databases and to a search server.

2. Description of the Related Art

With a progress in the electronic description of document information, a request has been made for a highly accurate document search technology for targeting a plurality of document databases different in kind. There has also been an increase in request for investigation as to correlation of a group of documents among the plurality of document databases. For example, many requests are made for a search of related items in an encyclopedia regarding interesting newspaper articles.

A currently practiced keyword search system can search a plurality of document databases by switching them. However, for a group of documents in a certain document database, it is impossible to search a group of documents related thereto from the same document database or another document database (a search system referred to as a document associative search).

Limited in the same document database, pre-calculation of a degree of correlation between documents enables a document associative search for searching and entering a group of documents related thereto to be realized. However, for a plurality of document databases, such a document associative search is, accompanied with an increase in the number of document databases, practically impossible because of an explosive increase in the number of combinations regarding the degree of correlation between documents to be pre-calculated.

On the other hand, Japanese Patent Laid-Open No. 2000-155758, entitled "DOCUMENT SEARCH METHOD AND DOCUMENT SEARCH SERVICE TARGERING PLURALITY OF DOCUMENT DATABASES", discloses a method of efficiently searching a group of documents from an optional document database, the group of documents being correlated to an optional group of documents in a document database specified by a user. According to the method disclosed therein, a high-speed document associative search is realized by using only, as a summary for search, characteristic words in a search input, which is entered as the group of documents. This method enables a user to execute a highly accurate and efficient document search by investigating correlation between the groups of documents while switching a plurality of document databases different in kind.

A search client of a document search server capable of performing an associative search by correlating a plurality of document databases has a mechanism for selecting a document database to be searched. The user carries out a search by selecting a document database to be searched from a document database list. Generally, a showing order of the list of selectable document databases is fixed. When a document database to be searched by the user was shown below in the list, the time and work of selection caused a reduction in convenience for the user. To enhance the user convenience, the ordering of the document databases must be changed according to a use state of the user.

A search server having the document databases registered therein generally collects registration fees and commissions from owners thereof. In many cases, the registration fee is fixed or set according to the number of times of accessing the document database. The commission is levied on a part of a profit obtained by the owner of the document database. Generally, a part of a subscription that the user pays to the owner of the document database is paid as a commission.

To calculate the registration fee or the commission, the document database must be evaluated. In the conventional keyword search server, the number of times of accessing the document database has typically been used. However, in an associative search server, there are factors, which make it impossible to perform an evaluation based on only the number of accessing times. For example, it is assumed that the registration fee of a document database enjoying a wide subscription is reduced while that of a document database enjoying a limited subscription is increased. If there is a document database frequently used as source articles for an associative search, because of its limited subscription, an evaluation of this document database is poor, consequently increasing a registration fee. However, since this document database is used as source articles for the associative search, it contributes to an increase in an activity level of the entire associative search server, which should be highly evaluated. In other words, only the use of the number of accessing times is not enough for the evaluation of the document database, and it is necessary to evaluate, by a proper measure, a contribution made to the activity level of the entire associative search server.

SUMMARY OF THE INVENTION

Objects of the present invention are to enhance convenience when a document database to be searched is selected by a user, and to properly evaluate a document database.

In accordance with the present invention, a document search server is provided, which is capable of performing an associative search by correlating a plurality of document databases. In this case, the history of the associative search is recorded as an associative search recording table, and an ordering of the document databases is carried out by using the associative search recording table. The associative search recording table records how many times and from which document database to which one the associative search is performed.

By using the associative search recording table, a showing order of document databases to be searched can be set according to a search result. For example, if a search result of a certain newspaper is shown, then a document database frequency associatively searched from the newspaper is ranked high in a list. The use of the document database list thus ordered enables a user to select a document database to be searched with high convenience.

In addition, when a registration fee or a commission of a document database is calculated, by using the number of times of being used as an association origin and the number of times of being used as an association target recorded in the associative search recording table, it is possible to calculate a registration fee or a commission more properly and specifically than a conventional method.

Specifically, the document search system of the present invention, capable of instructing a document search by specifying a document database to be searched next among a plurality of document databases based on the search result of the document database, comprises a step of storing an associative search recording table recording the number of times $x_{ij}$ of searching a document database j based on the search result of a document database i.

The associative search recording table can be used for changing a showing order of document databases to be searched. The associative search recording table may be stored for each user, and, by using such an associative search recording table for each user, the showing order of the document databases to be searched may be changed according to each user.

The associative search recording table can be used for calculating a registration fee of each document database. In this case, the registration fee may be calculated according to a sum of the number of times of being a search origin for a document search and the number of times of being a search target for a document search.

In accordance with the present invention, a search server is provided, which is adapted to mediate between a search client and a plurality of document databases, the search client being capable of instructing a document search by specifying a document database to be searched next among a plurality of document databases based on the search result of the document database. In this case, the search server comprises: search query analyzing means for analyzing a search query from the search client; search query constructing means for sending the search query analyzed by the search query analyzing means to the document database specified by the search client; means for sending the search result of the specified document database to the search client; and associative search recording table storing means for storing an associative search recording table recording the number of times $x_{ij}$ of searching a document database j based on the search result of a document database i.

BRIEF DESCRIPTION OF THE DRAWINGS

FIG. 3 is a view showing an example of an associative search recording table.

FIG. 5 is a view showing an example of the associative search recording table.

FIG. 14 is a view showing an example of a user administration table.

DESCRIPTION OF THE PREFERRED EMBODIMENTS

Figure 1:
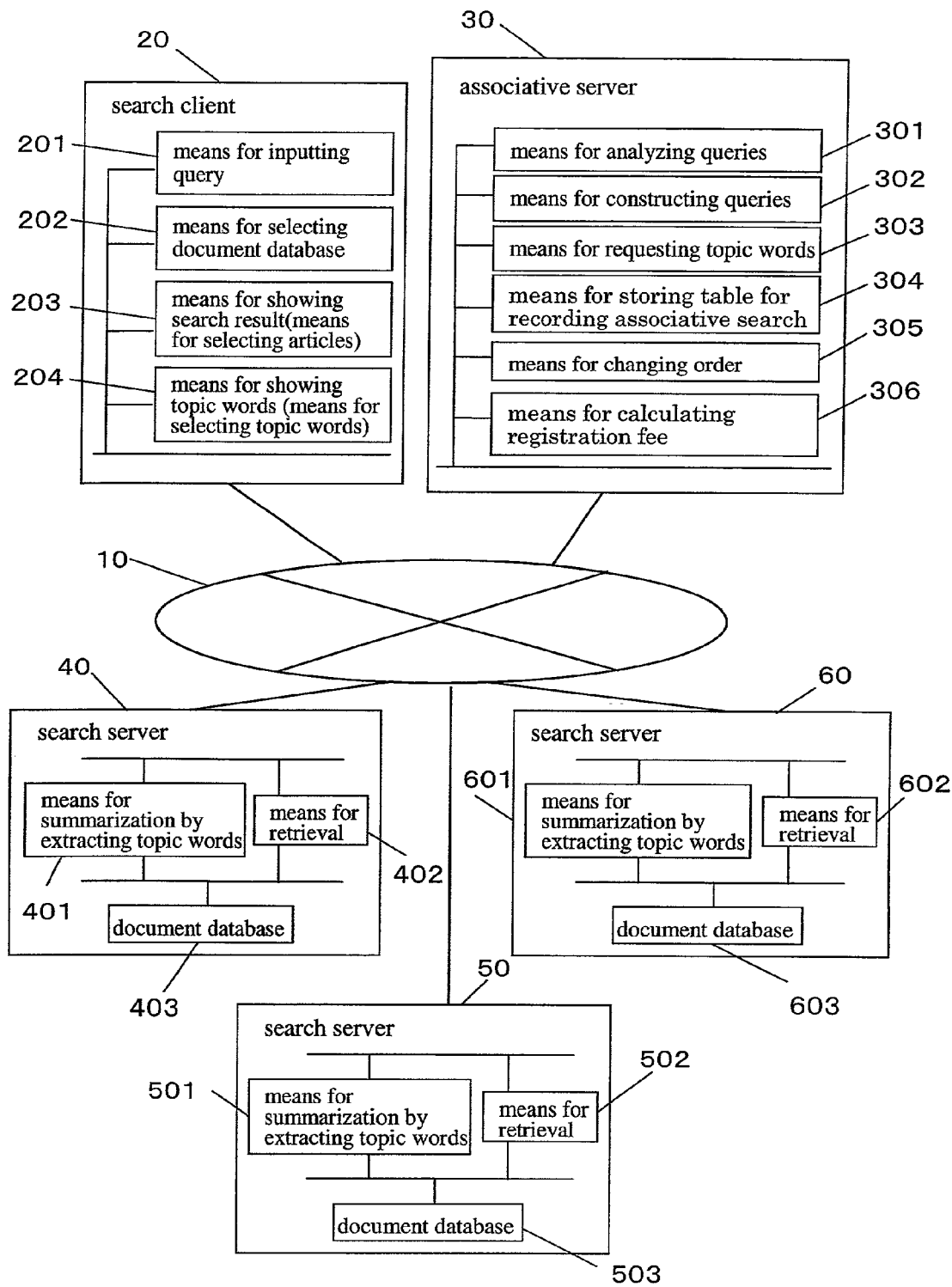
FIG. 1 is a view showing a basic configuration example of the present invention.

Next, preferred embodiments of the present invention will be described with reference to the accompanying drawings. In the drawings, the same functional portions are denoted by the same reference numerals, and descriptions thereof will be omitted.

FIG. 1 schematically shows an example of a system configuration for realizing the present invention. This system is configured by interconnecting a search client 20, search servers 40, 50, and 60, and an associative search server 30 through a communication network 10: the search client 20 being adapted to realize a search interface for enabling a user to enter a search query, for selecting a document database to be searched, and for showing a search result; the search servers 40, 50, and 60 being provided for searching document databases; and the associative search server 30 being provided to mediate between the search client 20 and the search servers 40, 50, and 60. In the example shown in the drawing, three search servers are connected to the communication network 10 as search servers for searching document databases. However, the number of search servers to be connected to the communication network can be optionally set.

Summarization means (401, 501 and 601) provided in the search servers (40, 50, and 60) make a summary of a group of documents searched from document databases (403, 503, and 603). Here, a summary means a collection of words clearly representing the content of the group of documents. For such summarization means, existing methods, e.g., "DOCUMENT CLASSIFICATION METHOD BASED ON PROBABILITY MODEL" disclosed in Japanese Patent Laid-Open Hei 9 (1997)-62693 and so on, can be used.

As an example, first, all documents included in a group of documents, targeted for summarization, are divided into words, and frequencies are totaled. Generally, since words often appearing in the group of documents have higher degrees of representation for the group of documents, it is more probable that words having higher appearing frequencies in the group of documents are included in a summary. However, general words often appearing in the documents, e.g., "do", are not proper as topic words. Thus, normally, topic words are selected by considering also the appearing frequency thereof in a document database, to which a group of documents belongs. That is, a word having a higher appearing frequency in a specified group of documents and a lower total appearing frequency in the entire document databases is a characteristic word, because it appears only in the specified group of documents and thus is proper to be included in a summary in order to characterize the group of the documents. Specifically, for each word in the group of documents, a word weight is calculated by a proper function containing an appearing frequency in the group of documents and an appearing frequency in the document database as inputs, and a word having a weight equal to/higher than a predetermined threshold value is employed for summarization.

Upon having received a search query from the associative search server 30, search means (402, 502, and 602) provided in the search servers (40, 50, and 60) search the group of documents having a high degree of correlation from the document databases (403, 503, and 603), and return the search result with a weighted degree of correlation to the associative search server 30. The search means in this case can be realized by, for example, a widely-known keyword search method. In other words, since the search query as an input is a weighted collection of words, OR search is carried out by considering each word as a weighted input keyword. In this case, a weight (degree of correlation) of the document of the search result is calculated in the following manner. That is, for each word included in both of a search query and a document of a search target, a total weight is calculated from a weight in the search query and a weight (e.g., frequency) in the document of the search target (e.g., product of both weights); and, by totaling the weights of all such words (e.g., sum total), a degree of correlation is obtained.

The search client 20 includes: search query inputting means 201; document database selecting means 202; search result showing means (article selecting means) 203; and topic word showing means (topic word selecting means) 204.

Figure 2:
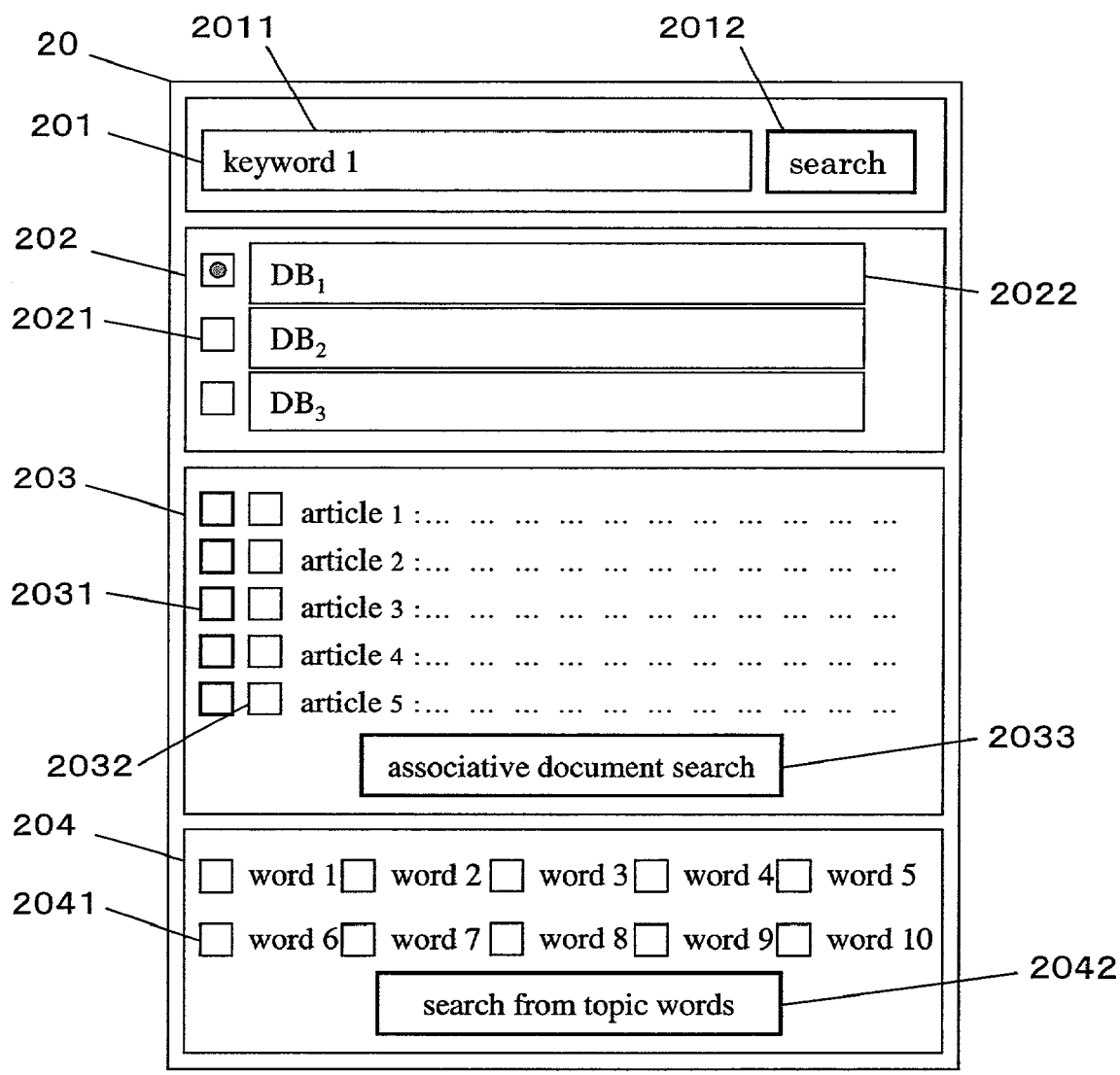
FIG. 2 is a view showing an example of a search client.

FIG. 2 shows an example of a search client. A user selects a document database to be searched by a document database selecting button 2021, enters a search query in a keyword input box 2011, and carries out a search by clicking a keyword search specifying button 2012. A search result is shown by the search result showing means 203, and a summary of the search result is shown by the topic words showing means 204. The content of the document of the search result can be read by a reading button 2031. In this example, a search result is shown, where $DB_1$ is selected as a document database to be searched, and "KEYWORD 1" is entered as a search query.

The search result showing means 203 also serves as article selecting means. An optional number of articles are selected by a document selecting button 2032, a document database to be searched is selected by the document database selecting means 202, and then a document related to each of the selected articles can be searched by clicking a "SEARCH FROM DOCUMENT" button 2033.

The topic word showing means 204 also serves as topic word selecting means. An optional number of words are selected by a word selecting button 2041, a document database to be searched is selected by the document database selecting means 202, and then a search from a topic word can be carried out by clicking a "SEARCH FROM TOPIC WORD" button 2042.

The associative search server 30 includes: search query analyzing means 301 for analyzing a search query sent from the search client 20; search query constructing means 302 having a function of distributing search queries to the search servers (40, 50, and 60) according to a document database to be searched which is sent from the search client 20; topic word requesting means 303 for requesting a topic word regarding a group of documents to the search servers (40, 50, and 60); associative search recording table storing means 304 for recording/storing an associative search recording table for recording the history of the associative search; showing order changing means 305 for changing a showing order of document databases; and registration fee calculating means 306 for calculating a registration fee of a document database.

The search query analyzing means 301 makes a search key by analyzing a search query sent from the search client 20 and identifying words included therein. For the search query analyzing means 301, optional one may be used, but it needs to include at least morphological analysis for dividing a sentence into words in the case of a Japanese sentence, and stemming, i.e., return to an original form and a part of speech of a word, in the case of an English sentence.

The search query constructing means 302 distributes search keys sent from the search client 20 as search queries to the search servers (40, 50, and 60) according to the document database to be searched. Each search key is: (1) a collection of words made by the search query analyzing means 301; (2) document IDs sent from the search result showing means 203 (article selecting means), provided in the search client 20; or (3) a collection of words sent from the topic word showing means 204 (topic word selecting means), provided in the search client. If a search key is (1) or (3), the collections of words are sent as search queries to the search servers. If a search key is (2), the topic word requesting means 303 requests topic words of documents corresponding to the document IDs thereof to the search server having the document database to be searched, and sends the collection of topic words sent in as a search query to the search server.

The associative search recording table storing means 304 records/stores the history of the associative search in an associative search recording table. FIG. 3 shows an example of the associative search recording table. Hereinbelow, a method of making the associative search recording table will be described by referring to FIG. 3.

For example, it is assumed that there are $DB_1$, $DB_2$, and $DB_3$ as usable document databases to be searched. It is also assumed that a user first searches $DB_1$ by using a keyword search in order to use a search client. In this case, 1 is added to $x_{41}$ in the column "$DB_1$" of the "key word" row of the associative search table. Then, it is assumed that certain documents in $DB_1$ is selected, and documents related to the selected documents is searched from $DB_2$. In this case, 1 is added to $x_{12}$ in the column "$DB_2$" of the "$DB_1$" row of the associative search recording table. Thereafter, the user updates the value of each cell in the associative search recording table by recording the history of the associative search while switching one document database to another.

The showing order changing means 305 changes a showing order of document databases in the document database selecting means 202 provided in the search client 20 based on the associative search recording table stored by the associative search recording table storing means 304. Conditions for ordering may include: (1) a document database frequently used as an associative search origin is ranked high; (2) a document database frequently used as an associative search target is ranked high; (3) a document database frequently used as both an associative search target and an associative search origin is ranked high; and (4) a document database frequently used as an associative search target when a document database as an associative search origin is fixed is ranked high.

To order the document databases on the condition (1), a value ($X_i$: i=1, 2, 3) as a sum total in a row direction for each document database on the associative search recording table is compared with another.

To order the document databases on the condition (2), a value ($Y_j$: j=1, 2, 3) as a sum total in a column direction for each document database on the associative search recording table is compared with another.

To order the document databases on the condition (3), a value as an addition of sum totals in the row and column directions for each document database on the associative search recording table, i.e., an added value (Xi+Yi: i=1, 2, 3) of a value ($X_i$: i=1, 2, 3) obtained on the condition (1) and a value ($Y_i$: i=1, 2, 3) obtained on the condition (2), is compared with another.

To order the document databases on the condition (4), when $DB_j$ is fixed as a document database for an associative search origin on the associative search recording table, the number of times $x_{ij}$ of document database $DB_j$ being used as an associative search target is compared with another.

Generally, in a situation where a user has obtained a certain search result, a selection of a document database to be searched next is naturally changed according to the document database of the search result that has been obtained by this time. For example, there are many cases where an encyclopedia is often searched after a search of a newspaper, and a biological dictionary is often searched after a search of a gene database. In such a situation, by changing a showing order of document databases based on the condition (4), a document database often searched next is ranked high according to the document database of the search result. Accordingly, a higher convenience is provided for a user.

Figure 6:
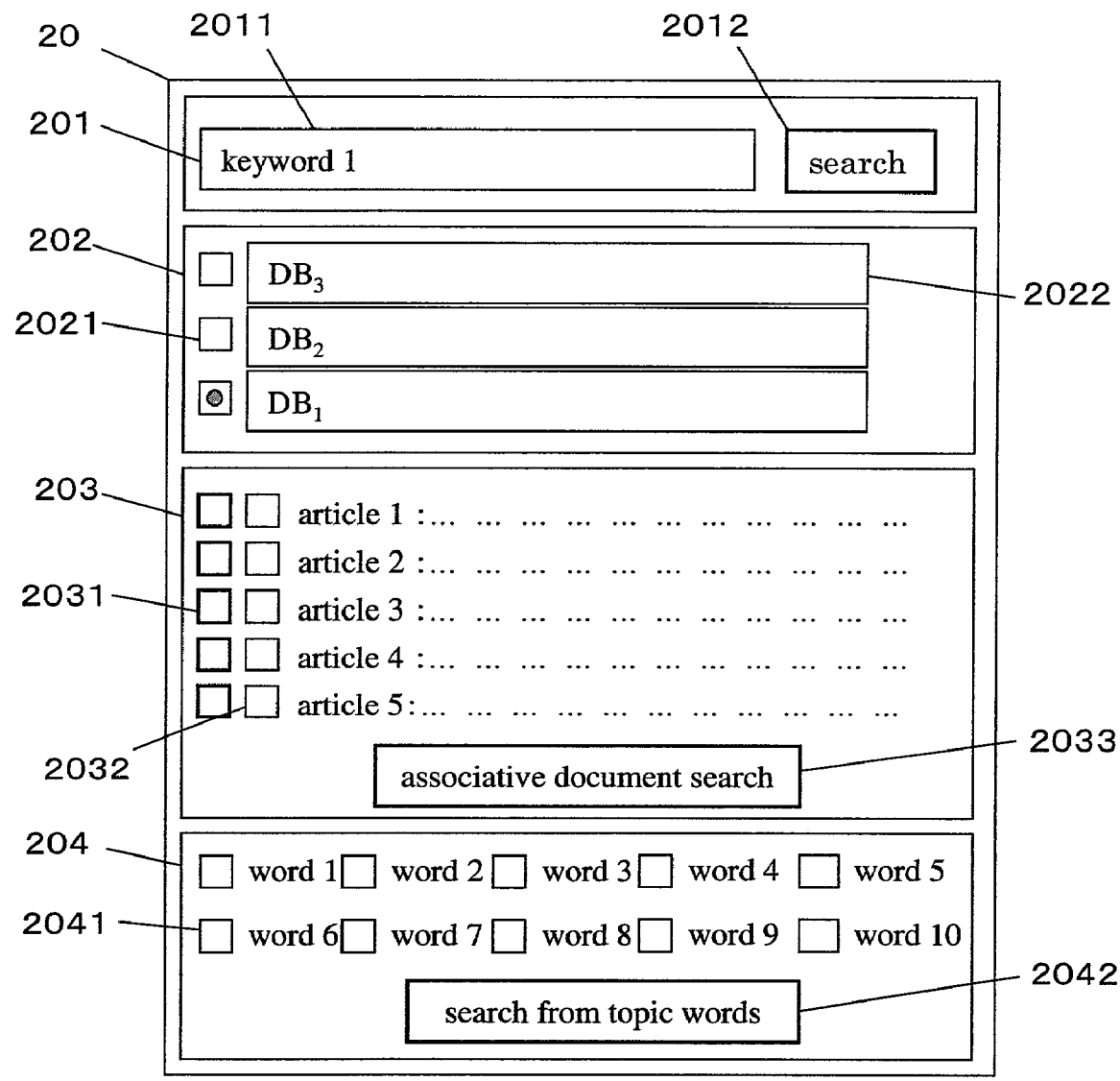
FIG. 6 is a view showing a change in a showing order of document databases.

Now, an example of changing a showing order by the showing order changing means 305 will be described with reference to FIGS. 4, 5, and 6.

Figure 4:
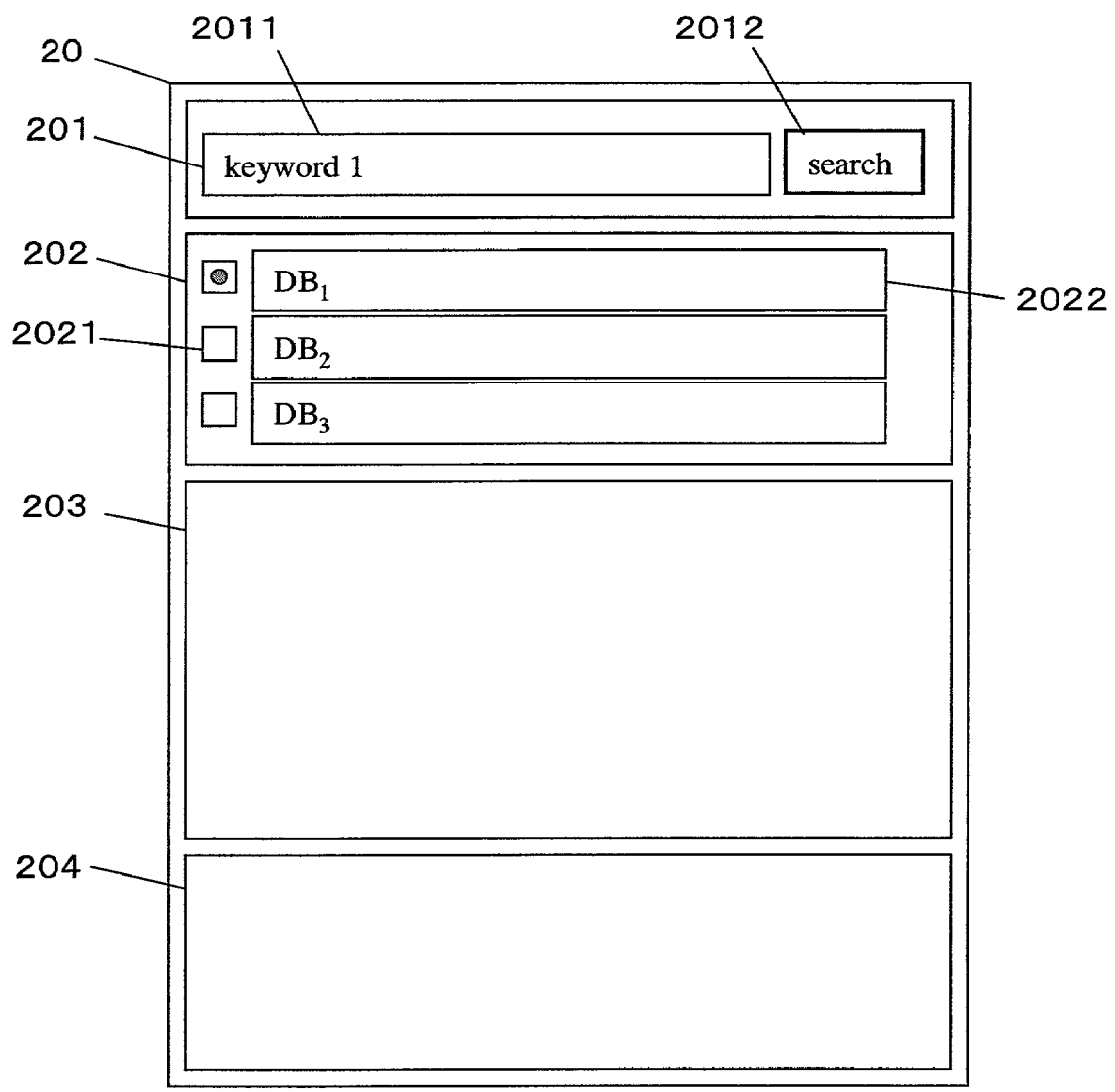
FIG. 4 is a view showing the search client at the time of starting a search.

FIG. 4 shows an example of the search client 20 at the time of starting a search. At the time of staring a search, nothing is shown in the search result showing means 203 and the topic word showing means 204. It is now assumed that, to start a search, a user enters "KEYWORD 1" in the keyword input box 2011 and selects $DB_1$ to be searched. FIG. 4 shows this state, and the search is executed by clicking the keyword search specifying button 2012.

Now, it is assumed that, as an associative search recording table, one like that shown in FIG. 5 is obtained, and the condition (4) is used as a condition for changing the showing order. In this associative search recording table, regarding document databases to be keyword-searched, frequencies are higher in the order of $DB_1$, $DB_2$, and $DB_3$. Accordingly, the showing order changing means 305 sets the showing order of the document databases to $DB_1$, $DB_2$, and $DB_3$ at the time of starting the search. On the other hand, in the case where $DB_1$ is set as a search origin, frequencies are higher in the order of $DB_3$, $DB_2$, and $DB_1$. Accordingly, the document databases of a search target are set to the order of $DB_3$, $DB_2$, and $DB_1$. FIG. 6 shows this state.

The registration fee calculating means 306 calculates a registration fee when the document database is registered in the search server, by using the associative search recording table. A registration fee is generally collected by deciding a term (e.g., once a year).

By using the associative search recording table, the document database can be evaluated. As described above, when the document database is subjected to evaluation, in the associative search server, there are factors disabling the evaluation to be made simply based on the number of accessing times. However, a proper evaluation can be carried out by using the condition (3). Under the condition (3), evaluated are not only the condition (2) corresponding to the number of accessing times, but also the condition (1) as the number of times of being used as source articles for the associative search. Accordingly, a correct evaluation can be made for the document database frequently used as source articles for the associative search, though subscription thereof may be limited. By lowering a registration fee for a highly evaluated document database while increasing a registration fee for a poorly evaluated document database, good-quality document databases are concentrated in the associative search server, thus increasing a utility value for the user. A following increase in the number of users is also expected, and an activity level of the associative search server itself is increased. Thus, the value of registering a document database in the associative search server by the owner of the good-quality document database can be increased.

As an example, $n(E-(Z_i-E))$ (i=1, 2, 3) is set as a calculation formula for a registration fee of $DB_i$ using the associative search recording table of FIG. 3. Here, $Z_i=X_i+Y_i-x_{ii}$ (i=1, 2, 3), $E=(Z_1+Z_2+Z_3)/3$ (average value of $Z_i$), and n indicate a unit price per 1 access. By using this calculation formula, a sum total of registration fees of document databases received by the associative search server is $n(E-(Z_1-E))+n(E-(Z_2-E))+n(E-(Z_3-E))=3nE=n(Z_1+Z_2+Z_3)$. Thus, by using the sum total registration fees as fees set according to the number of accessing times of the entire document databases, it is possible to lower a registration fee for a highly evaluated document database and to increase a registration fee for a poorly evaluated document database.

By using the foregoing means, it is possible to properly change a showing order of document databases to be shown by the document database selecting means of the search client 20 and also to properly calculate a registration fee for each document database, while storing the history of the associative search in the associative search recording table.

Next, by referring to FIGS. 7 to 9, descriptions will be made for a flow of execution in the following order: (1) keyword search, (2) related document search, and (3) search from topic words.

Figure 7:
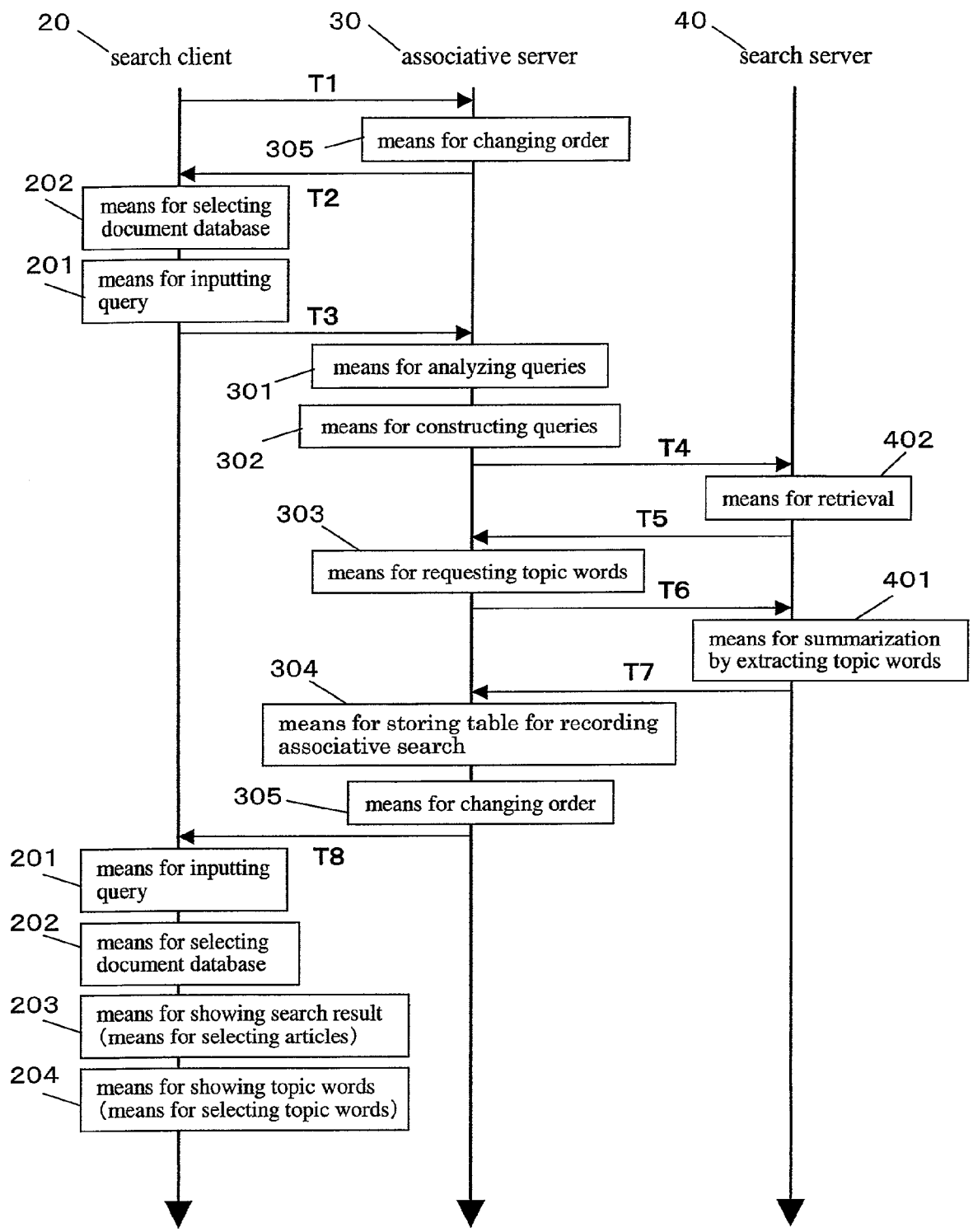
FIG. 7 is a view showing a flow of execution when a keyword search is carried out.

FIG. 7 shows a flow of execution when a keyword search is carried out for the search server 40. First, by using the search client 20, a user connects to the associative search server 30 (T1). The showing order changing means 305 changes a showing order of document databases by referring to an associative search recording table, and sends the changed order to the search client 20 (T2). The document database selecting means 202 of the search client 20 shows the document databases according to the received order. Then, the user selects a document database to be searched by the document database selecting means 202, and enters a search query to the search query inputting means 201. Information on the search query and the document database to be searched is sent to the associative search server 30 (T3).

The search query analyzing means 301 of the associative search server 30 analyzes the search query, and a result thereof is sent to the search server 40 by the search query constructing means 302 (T4). The search means 402 of the search sever 40 searches documents related to the search query from the document database 403 and sends the result thereof to the associative search server 30 (T5). The topic word requesting means 303 of the associative search server 30 requests a summary of the received documents to the search server 40 (T6). Then, the summarization means 401 of the search server 40 makes a summary of the received documents and sends it to the associative search server 30 (T7).

The associative search recording table storing means 304 of the associative search server 30 records the history of this search (search from keyword to search server 40). The showing order changing means 305 changes a showing order of document databases by referring to the associative search recording table and sends the changed order to the search client 20. At the same time, the search result and the topic words are also sent to the search client 20 (T8). The search client 20 shows the showing order of the document databases, the search result, and the topic words that have been sent in, respectively by the document database selecting means 202, the search result showing means 203, and the topic word showing means 204.

Figure 8:
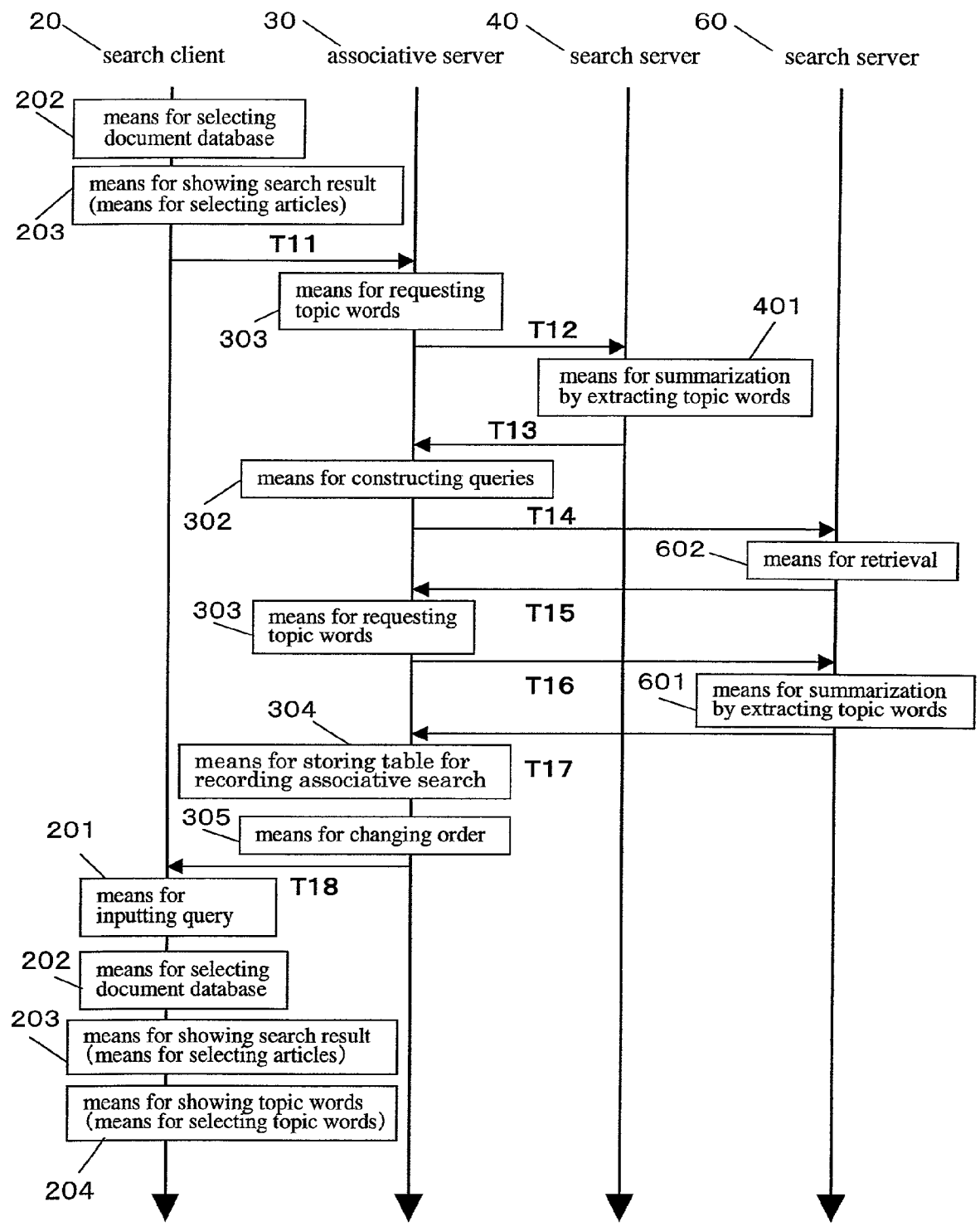
FIG. 8 is a view showing a flow of execution when a search is carried out by using documents as keys.

FIG. 8 shows a flow of execution when the search server 60 is searched by using documents as keys obtained as a result of searching the search server 40. First, a user selects a document database to be searched by the document database selecting means 202 and then selects articles by using the search result showing means (article selecting means) 203. Information on the selected articles and the document database to be searched is sent to the associative search sever 30 (T11). The topic word requesting means 303 of the associative search server 30 requests a summary of the received document to the search server 40 (T12). The summarization means 401 of the search server 40 makes a summary of the received document and sends it to the associative search server 30 (T13).

The search query constructing means 302 of the associative search server 30 sends topic words returned from the search server 40 as a search query to the search server 60 (T14). The search means 602 of the search server 60 searches documents related to the search query from the document database 603 and sends the result thereof to the associative search server 30 (T15). The topic word requesting means 303 of the associative search server 30 requests a summary of the received documents to the search server 60 (T16). The summarization means 601 of the search server 60 makes a summary of the received documents and sends it to the associative search server 30 (T17).

The associative search recording table storing means 304 of the associative search server 30 records the history of this search (search of search server 60 from search server 40). The showing order changing means 305 changes a showing order of document databases by referring to the associative search recording table and sends the changed order to the search client 20. At the same time, the search result and the topic words are also sent to the search client 20 (T18). The search client 20 shows the showing order of the document databases, the search result, and the topic words that haven been sent in, respectively by the document database selecting means 20, the search result showing means 203, and the topic word showing means 204.

Figure 9:
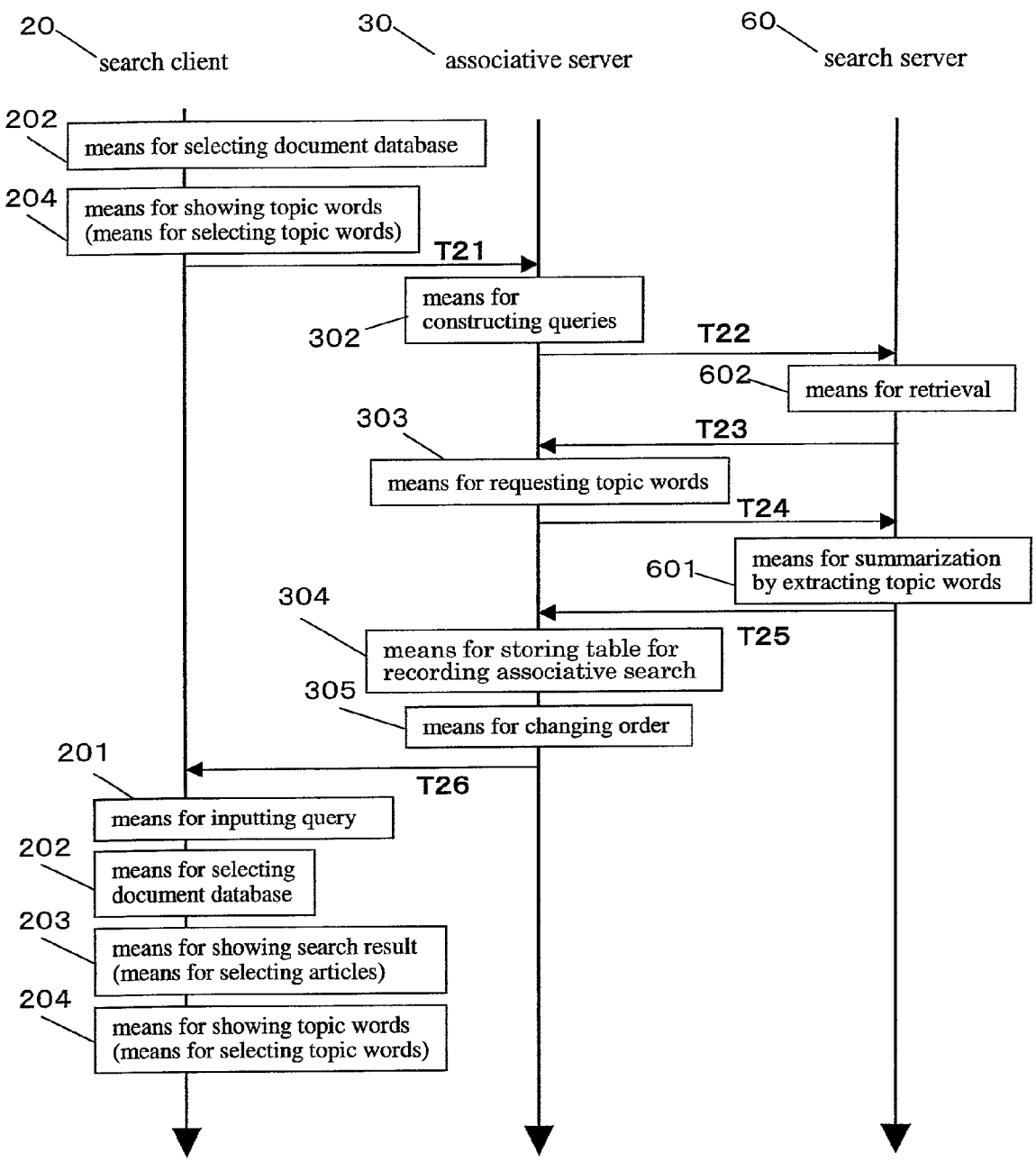
FIG. 9 is a view showing a flow of execution when a search is carried out by using topic words as keys.

FIG. 9 shows a flow of execution when the search server 60 is searched by using topic words of the document as keys obtained as a result of searching the search server 40. First, a user selects a document database to be searched by use of the document database selecting means 202 and then selects words by using the topic word showing means (topic word selecting means) 204. Information on the selected words and the document database to be searched is sent to the associative search server 30 (T21). The search query constructing means 302 of the associative search server 30 sends the received words as a search query to the search server 60 (T22). The search means 602 of the search server 60 searches documents related to the search query from the document database 603 and sends a result thereof to the associative search server 30 (T23). The topic word requesting means 303 of the associative search server 30 requests a summary of the received documents to the search server 60 (T24). The summarization means 601 of the search server 60 makes a summary of the received documents and sends it to the associative search server 30 (T25).

The associative search recording table storing means 304 of the associative search server 30 records the history of this search (search of search server 60 from search server 40). The showing order changing means 305 changes a showing order of document databases by referring to the associative search recording table and sends the changed order to the search client 20. At the same time, the search result and the topic words are also sent to the search client 20 (T26). The search client 20 shows the showing order of the document databases, the search result, and the topic words that have been sent in, respectively by the document database selecting means 202, the search result showing means 203, and the topic word showing means 204.

Figure 10:
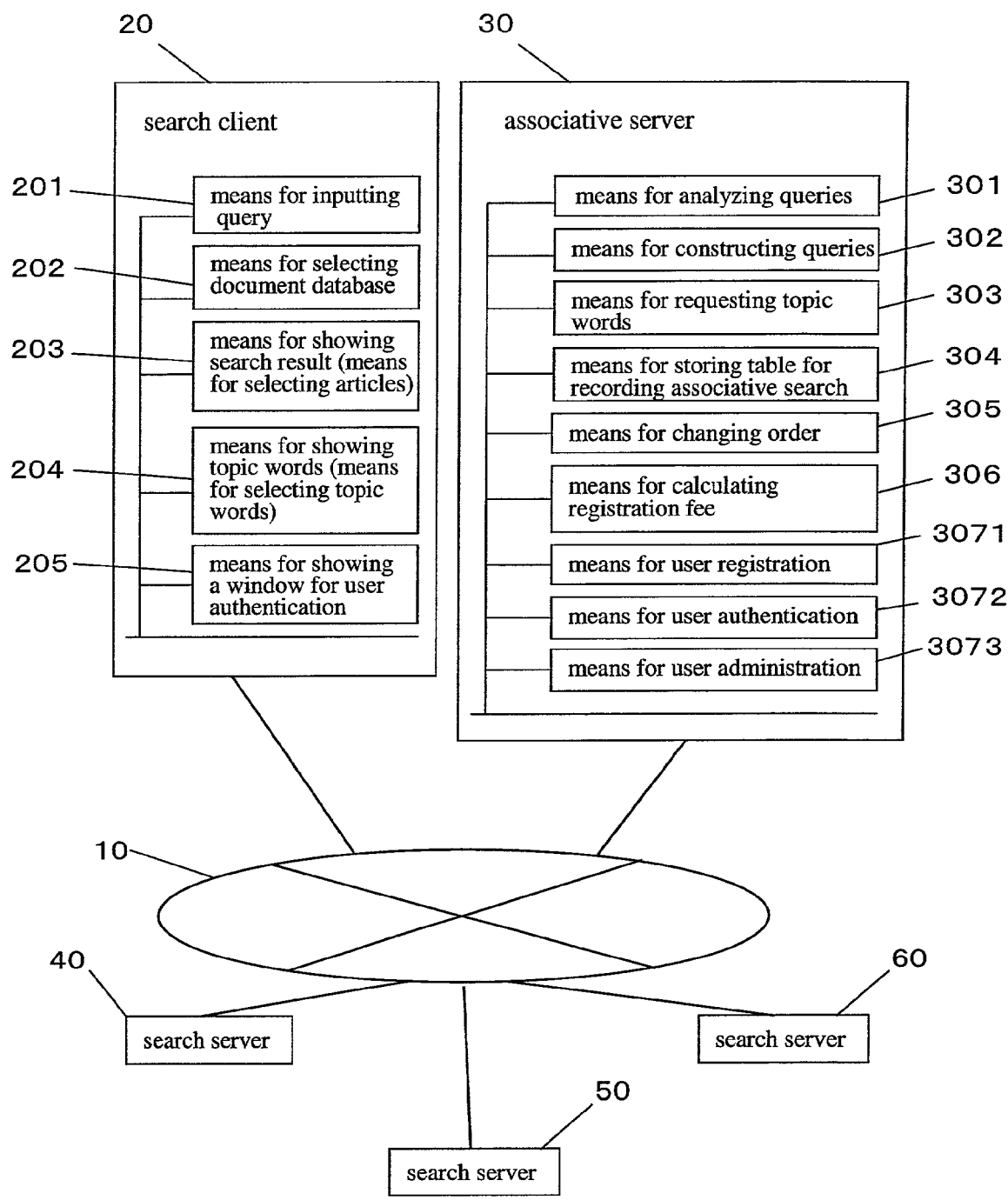
FIG. 10 is a view showing a configuration example in a case where an associative search recording table is stored for each user.

In the associative search recording table, not only by recording the history of all users of the associative search servers, but also by individually recording the history of each user, it is possible to provide a showing order of document databases according to each use history of each user. FIG. 10 shows an example of a system configuration when an associative search recording table is stored for each user.

In the system configuration example of FIG. 10, user registration means 3071, user authentication means 3072, and user administration means 3073 are added to the associative search server 30 of FIG. 1. The user registration means 3071 is means for registering a new user. The user authentication means 3072 is means for authenticating a registered user. For example, authentication is carried out by a password of each user. The user administration means 3073 is means for administering correspondence between a user and an associative search recording table. In addition, user authentication window showing means 205 is added to the search client 20 of FIG. 1. The user authentication window showing means 205 is means for showing a user authentication window when the user connects to the associative search server 30. For example, a window like that shown in FIG. 11 is shown.

Figure 12:
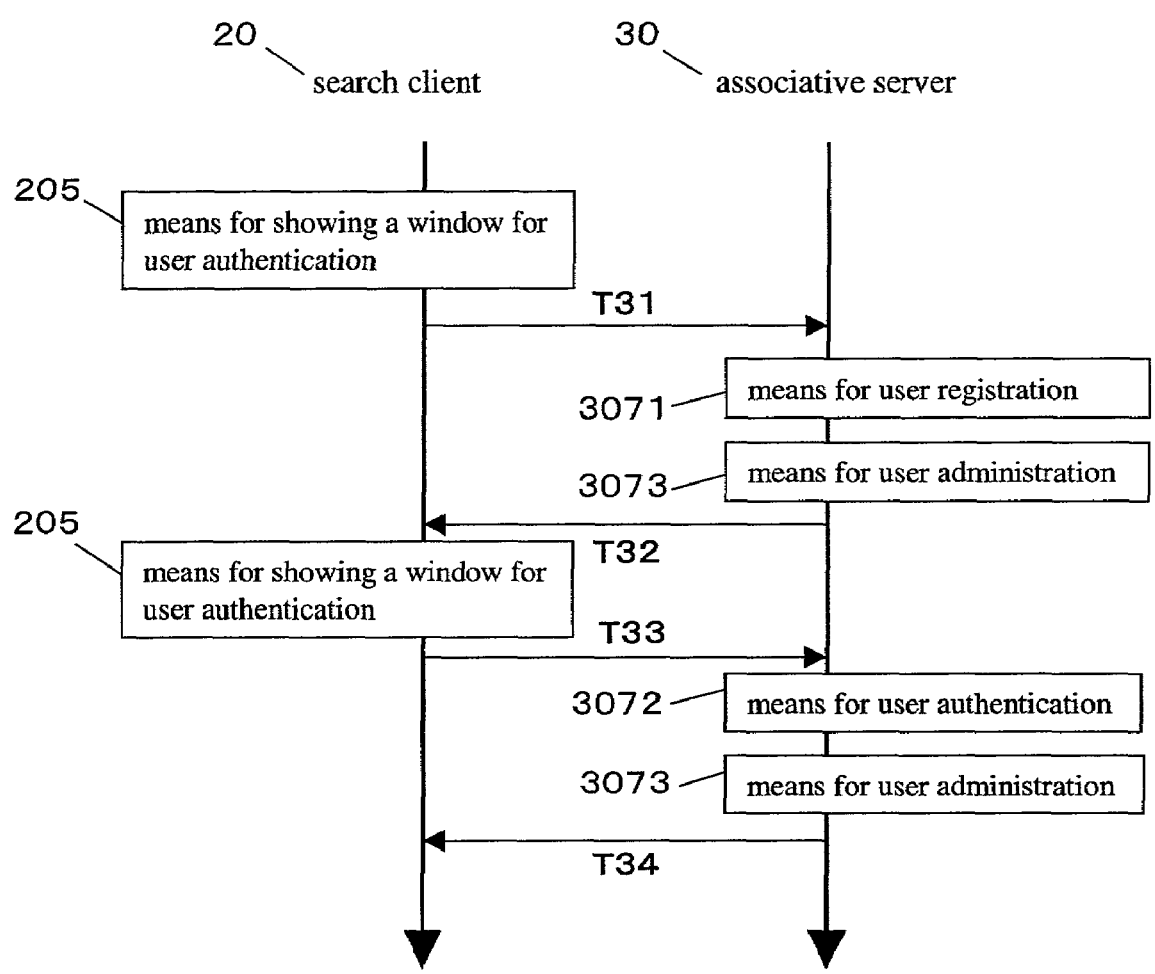
FIG. 12 is a view showing a flow of execution in the user authentication.

Now, descriptions will be made for a flow of processing when user authentication is carried out after a user registration by referring to FIG. 12. The user enters a user name to a user name input box 2051 and a password to a password input box 2052, and clicks a "REGISTRATION" button 2054. The user name and the password are sent to the associative search server 30 (T31), and the user registration is executed by the user registration means 3071. Further, correspondence is checked with the associative search recording table by the user administration means 3073.

Figure 13:
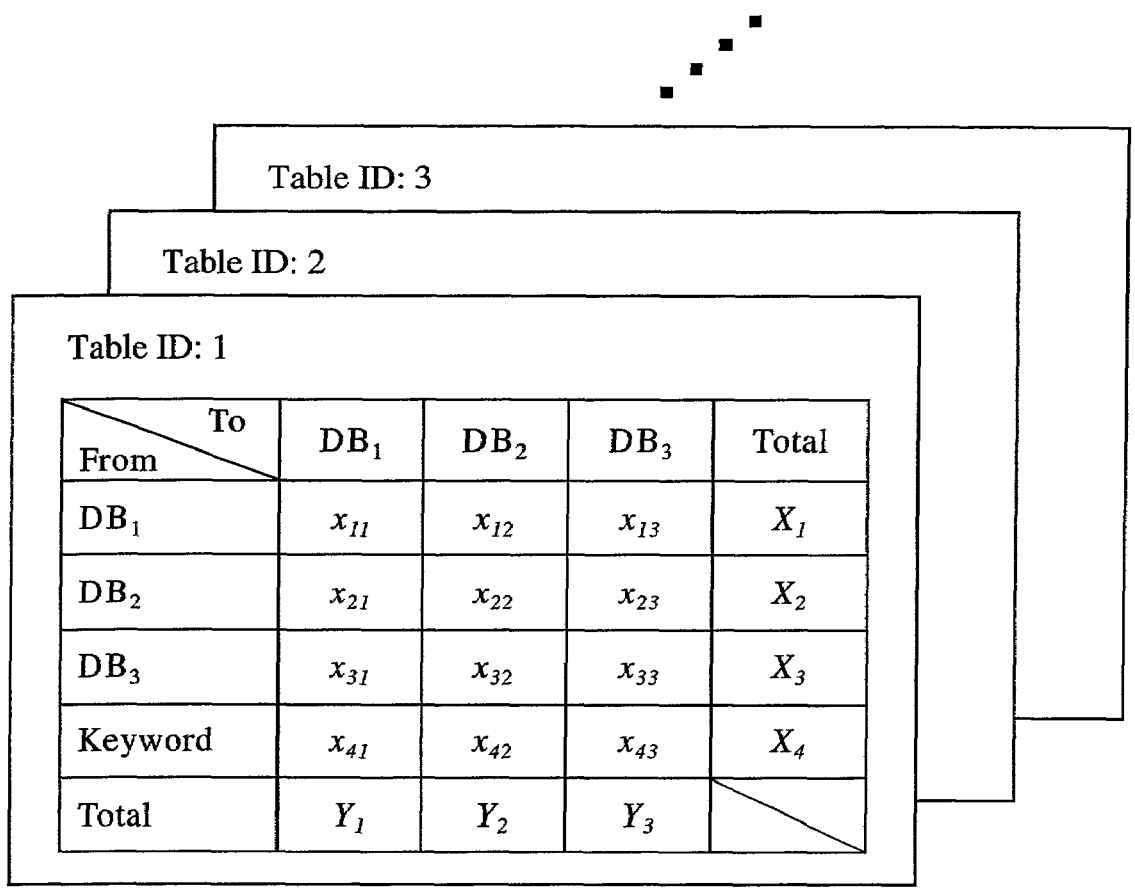
FIG. 13 is a view showing an example of the associative search recording table for each user.

More specifically, when an associative search recording table is stored for each user, the associative search recording table storing means stores the associative search recording table different from one user to another as shown in FIG. 13. The user administration means 3073 prepares a user administration table like that shown in FIG. 14. The user administration table records, for each user, a user ID, a user name, a password, an ID of a corresponding associative search recording table, a registration date, and so on. Optional user information can be recorded in the user administration table, but the items of a user name, a password, and a table ID must always be included. In the case of the user registration, the user registration means 3071 adds a necessary information to the user administration table.

Figure 11:
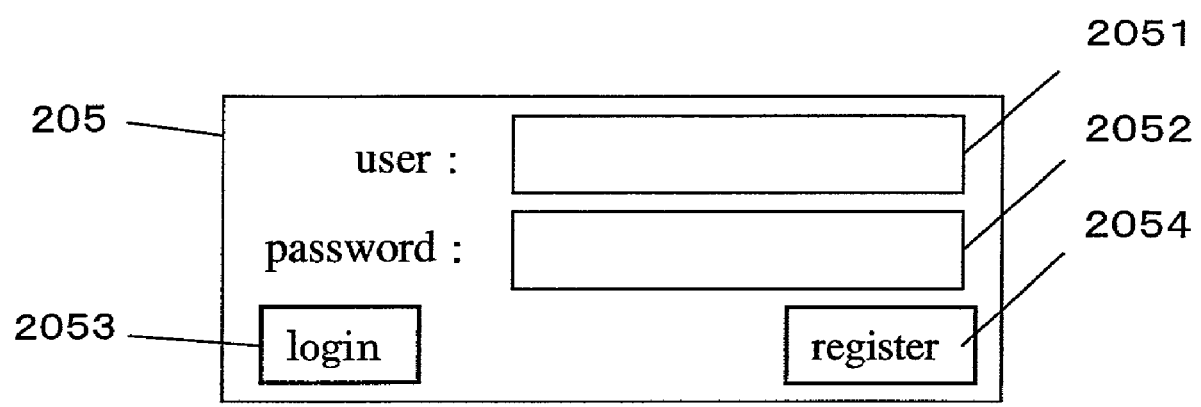
FIG. 11 is a view showing an example of user authentication.

After the successful registration, the processing returns to the search client 20 (T32), and, by the user authentication window showing means 205, a user authentication window like that shown in FIG. 11 is shown. The user enters the registered user name and the corresponding password, respectively to the user name input box 2051 and the password input box 2052, and connects to the associative search server 30 by clicking a "LOG-IN" button 2053 (T33). The user authentication means 3072 performs user authentication by referring to the user administration table. The user administration means 3073 checks correspondence with the prepared associative search recording table by referring to the user administration table.

As described above, by storing the associative search recording table for each user, it is possible to change the showing order of the document databases according to the use state of the user.

The present invention is advantageous in that since a user can select a database to be searched next from a list of document databases properly rearrrayed according to a search result, it is possible to perform a search with much higher convenience. The present invention is also advantageous in that it is possible to calculate a registration fee or a commission for a document database more properly.

What is claimed is:

1. A document search system capable comprising:
an associate server which is capable of instructing a document search by specifying a document database j to be searched next among a plurality of document databases based on a search result of a document previous search of a document database i;
an associative search recording table recording the number of times $x_{ij}$ of searching said document database j based on the search results generated from the previous searches of said document database i;
means for sending a search result of said specified document database to a client; and
means for changing a showing order of document databases to be searched by using data from said associate search recording table.
wherein a different associate search recording table is stored for each user, and by using said different associate search recording table for each user, a showing order of document databases to be searched is changed according to said user,
wherein i denotes a first document database,
wherein i denotes a second document database, and
wherein $x_{ij}$ denotes a number of times of searching said document database j based on the search results generated from the previous searches of said document database i.

2. The document search system according to claim 1, further comprising:
means for calculating a registration fee of each document database by using said associate search recording table.

3. The document search system according to claim 2, wherein a registration fee is calculated according to a sum of the number of times a document database is a search origin for a document search and the number of times a document database is a search target for a document search.

4. The document search system according to claim 1, wherein for each document database j of said plurality of document databases, said associative search recording table has plural entries each indicating the number of times $x_{ij}$ of searching the document database j based on the search results generated from the previous searches of document databases i, respectively.

5. The document search system according to claim 1, wherein said associative search recording table records the number of times $x_{ij}$ of searching said document database j based on a search result using a keyword i for searching said document database i.

6. The document search system according to claim 5, wherein for each document database j of said plurality of document databases, said associative search recording table has plural entries each indicating the number of times $x_{ij}$ of searching the document database j based on the search results generated from the previous searches of document databases i or keywords i for searching said document databases i, respectively.

7. A search server for mediating between a search client and a plurality of document databases, comprising:
associative server means which is capable of instructing a document search by specifying a document database j to be searched next among a plurality of document databases based on a search result generated from a previous search of a document database i,
wherein said associative server means comprises:
search query analyzing means for analyzing a search query from said search client,
search query constructing means for sending the search query analyzed by said search query analyzing means to the document database specified by the search client,
means for sending a search result of said specified document database to said search client,
associative search recording table storing means for storing an associative search recording table which records the number of times $x_{ij}$ of searching said document database j based on the search results generated from the previous searches of said document database i, and
showing order changing means for changing a showing order of document databases to be searched and to be shown to said search client by using data from said associative search recording table,
wherein said associative search recording table storing means stores a different associative search recording table for each user,
wherein said showing order changing means changing a showing order of document databases to be searched and to be shown to said search client according to said user by using said different associative search recording table for each user,
wherein i denotes a first document database,
wherein j denotes a second document database, and
wherein $x_{ij}$ denotes a number of times of searching said document database i based on the search results generated from the previous searches of said document database i.

8. The search server according to claim 7, wherein a registration fee of each document database is calculated by using said associative search recording table stored by said associative search recording table storing means.

9. The search server according to claim 7, wherein for each of said plurality of document databases, said associative search recording table has plural entries each indicating the number of times $x_{ij}$ of searching the document database j based on the search results generated from the previous searches of document databases i, respectively.

10. The search server according to claim 7, wherein said associative search recording table records the number of times $x_{ij}$ of searching a document database j based on a search result of a keyword i for searching said document database i.

11. The search server according to claim 10, wherein for each document database j, of said plurality of document databases, said associative search recording table has plural entries each indicating the number of times $x_{ij}$ of searching the document database j based on the search results generated from the previous searches of document databases i or keywords i for searching said document databases i, respectively.

12. A document search method comprising the steps of:
instructing a document search by specifying a document database j to be searched next among a plurality of document databases based on a search result generated from a previous search of a document database i;
storing an associative search recording table which records the number of times $X_{ij}$ of searching said document database j based on the search results generated from the previous searches of said document database i;

using data from said associative search recording table to help specify said document database j to be searched next among said plurality of document databases;

sending a search result of said specified document database to a search client; and changing a showing order of document databases to be searched by using data from said associative search recording table, wherein a different associative search recording table is stored for each user, and by using said different associative search recording table for each user, a showing order of document databases to be searched is changed according to said user, wherein i denotes a first document database, wherein i denotes a second document database, and wherein $X_{ij}$ denotes a number of times of searching said document database j based on the search results generated from the previous searches of said document database i.

13. A document search method according to claim 12, further comprising: calculating a registration fee of each document database by using said associative search recording table.

14. A document search method according to claim 13, further comprising:

calculating the registration fee according to the sum of a number of times a document database is a search origin for a document search and the number of times a document database is a search target for a document search.

15. A document search method according to claim 12, wherein for each document database j, of said plurality of document databases, said associative search recording table has plural entries each indicating the number of times $X_{ij}$ of searching the document database j based on the search results generated from the previous searches of said document databases i, respectively.

16. A document search method according to claim 12, further comprising:

storing, in the associative search recording table, the number of times $X_{ij}$ of searching a document database j based on a search result of a keyword j for searching said document database i.

17. A document search method according to claim 16, wherein for each document database j, of said plurality of document databases, said associative search recording table has plural entries each indicating the number of times $X_{ij}$ of searching the document database j based on the search results generated from the previous searches of said document databases i or keywords i for searching said document databases i, respectively.

* * * * *